June 11, 1940.   L. T. SACHTLEBEN   2,203,879
SOUND FILM PRINTER
Filed July 31, 1937
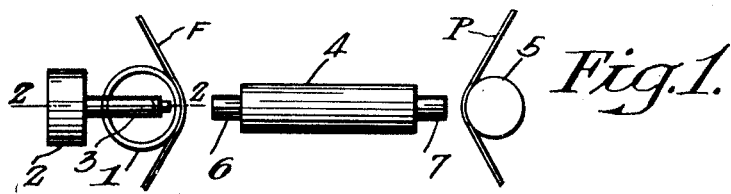
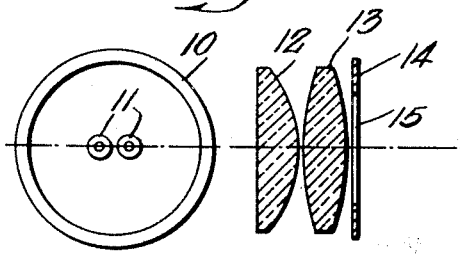
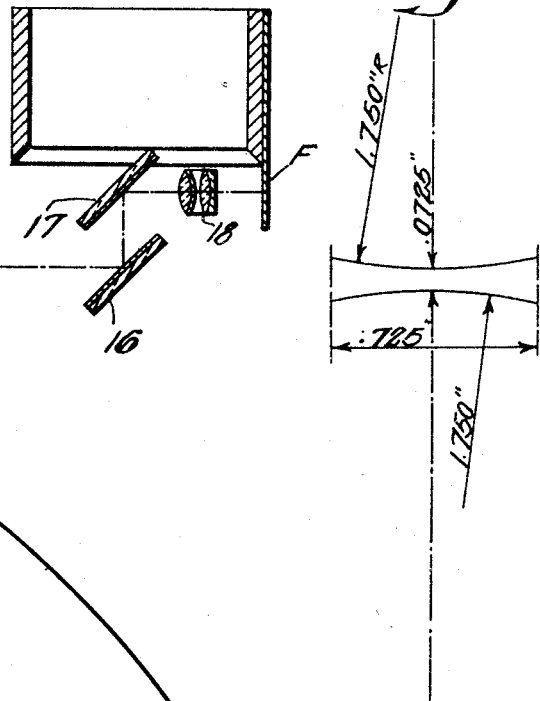
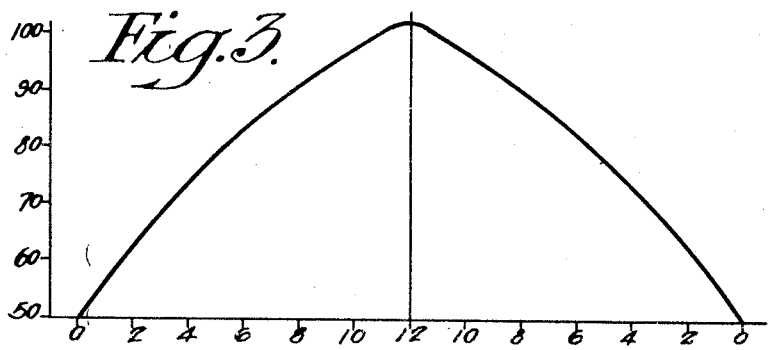
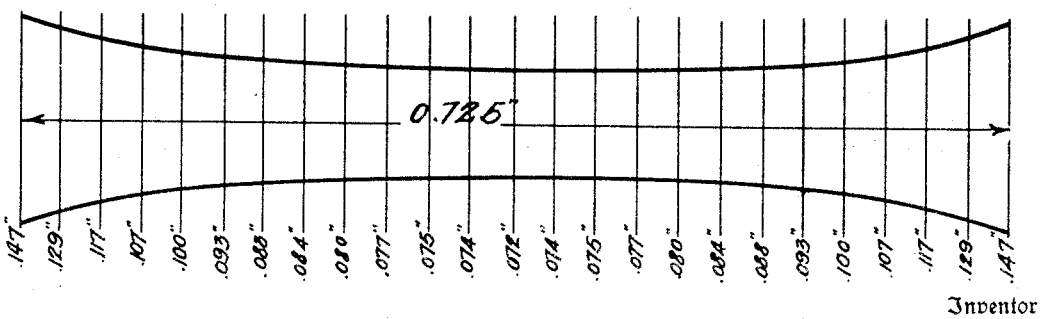
Inventor
Lawrence T. Sachtleben
By
Attorney Patented June 11, 1940

2,203,879

UNITED STATES PATENT OFFICE 2,203,879

SOUND FILM PRINTER

Lawrence T. Sachtleben, Camden, N. J., assignor to Radio Corporation of America, a corporation of Delaware Application July 31, 1937, Serial No. 156,682

3 Claims. (Cl. 88—24)

This invention pertains to an optical printer for printing sound films either with or without a change in size.

In the projection or optical printing of sound track from one film to another, the difficulty has heretofore been encountered of a lack of uniform illumination across the width of the sound track. In printers of the type used for this purpose, it has been customary to use projection lenses of the same general type as microscope objectives having a length along the optical axis which is rather large compared to the diameter of the lens. It has been discovered that a considerable portion of the lack of uniformity of the projected image is due to the vignetting effect of these relatively long lenses, and the present invention pertains to a method of and apparatus for compensating for this lack of uniform illumination.

In the application of my invention to a continuous printer, I increase the length of film illuminated longitudinally of the sound track in proportion to the loss of brightness in the optical system and thereby secure uniform exposure over the entire width of the sound track.

One object of my invention is to provide an improved sound track printer.

Another object of my invention is to provide a sound track printer which will give uniform exposure over the entire width of the sound track.

Another object of my invention is to provide an improved illuminating system for illuminating the sound track to be printed.

Another object of my invention is to provide a novel form of printing aperture for compensating for light losses in the optical system.

Other and incidental objects of my invention will be apparent to those skilled in the art from a reading of the following specification and an inspection of the accompanying drawing in which Figure 1 is a diagrammatic elevation of a continuous sound printer of a type adapted to embody my invention, Figure 2 is a transverse section of the illuminating system of the printer taken on the line 2—2 of Fig. 1, Figure 3 is a curve showing the variation in illumination of the sound track image using a straight slit in the illuminating device in the usual type of projection optical system, Figure 4 is a greatly enlarged view of a slit proportioned to compensate for the variation in illumination shown in Fig. 3, and Figure 5 is a view of a commercial form of slit constructed practically in accordance with the dimensions shown in Fig. 4.

Referring first to Fig. 1: A film F from which a print is to be made is fed over the drum 1 by any appropriate means such, for example, as a magnetic drive for the drum as shown and described in Kellogg Reissue Patent No. 19,270 dated August 14, 1934. Light emitted from an incandescent lamp in the lamp house 2 is directed by means of an optical system 3 onto the film at an appropriate point and light emerging from the film is directed by the optical system 4 upon the film P on which the print is to be made. This film P is fed over a drum 5 in a manner similar to the manner in which the film F is fed over the film drum 1 and the films are fed at uniform speeds if the print ratio is to be 1:1 or at speeds proportional to the ratio of reduction or enlargement.

The film F projects over the edge of the drum 1 permitting the sound track area to be unobstructed.

The optical system 4 is provided with appropriate objectives 6 and 7 directing light into and out of the optical system which may be of any suitable type.

These objectives 6 and 7, as stated above, are analogous to microscope objectives due to the small size of the sound track and the extremely small sound wave images recorded thereon, and due to the barrel-length of these lenses a considerable vignetting effect occurs.

The illuminating system as shown in Fig. 2 includes an incandescent lamp 10 having a filament 11. The light beam is directed by the condensers 12 and 13 through the disc 14 which is provided with a slit 15. Light emerging from the slit 15 passes to the mirrors 16 and 17 and is directed to the compound lens 18 upon which it is focused and which, in turn, focuses a reduced image of the slit 15 upon the film F at the sound track portion thereof.

The mirrors 16 and 17 may be of polished aluminum or may be of glass coated with silver or aluminum or chromium and aluminum on their front surfaces.

The image on the film F of the slit 15 is of sufficient length transversely of the sound track to cover the entire width of the sound track.

Light, after passing through the film F, is, as stated before, directed by the optical system 4 upon the film P. When the slit 15 is made of uniform width, then, due to the vignetting effect of the lenses 6 and 7, the illumination produced upon the film P as measured along the line of light and transversely of the sound track is as shown in the curve at Fig. 3, i. e., if the illumination at the center of the image be taken as 100%, then at the edges of the sound track the illumination falls to 50% and the density of the print image in relation to the image on the film F will be varied accordingly.

In order to compensate for this, the necessary widths for the slit 15 are shown in Fig. 4, as determined from the curve given in Fig. 3. The length of the slit 15 is as shown in Fig. 4 .725" and the several widths thereof necessary to compensate for the irregularity in illumination are indicated in alignment with the figure in decimal fractions of an inch.

It will be apparent from these figures that the curvatures necessary for the proper correction of the illumination approximate circular arcs and I have determined that satisfactory illumination can be accomplished by using curvatures such as given in Fig. 5.

In the type of slit shown in Fig. 5, the length of the slit as in Fig. 4 is .725", the width of the slit at its middle point is .0725 and the radius of the curvature of each of the sides is 1.750". Since these curves are arcs of circles they are comparatively simple to construct commercially as compared to a curve other than a circular arc, and I have ascertained that using this form of aperture (with proper reduction ratio to illuminate the standard size sound track of 35 mm. film) the density of the print is rendered substantially uniform from the center to the edge.

It will be apparent to those skilled in the art that due to the finite width of the slit used for illumination, the film P must move in the same direction in which the image of the film F tends to move and at the same speed, and the uniform exposure is accomplished by the greater exposure time adjacent the edges of the sound track than in the middle thereof.

It will be apparent from Fig. 2 that the lamp 10 has a filament 11 composed of two or more parallel helices. These coils or helices instead of being arranged in a plane perpendicular to the optical axis, as is customary, are arranged in a plane parallel with the optical axis and I find that this arrangement produces a more uniform illumination of the aperture than could be otherwise secured.

While my invention is described as applied to a sound film printer, it will be apparent to those skilled in the art that it is not limited thereto but may be used in sound recorders, sound reproducers or any similar device where it is desired to secure uniform total illumination across the width of the sound track.

I claim as my invention:

1. A projection printer including means for moving a film having an image thereon past an operational point, an optical system for producing an image of said film in an image plane, and means for moving sensitized film stock past the image in said image plane, a light source for illuminating the film, an illuminating aperture defining a beam of light from said source, and lens means for directing light from said aperture to the film and imaging said aperture on said film, the said aperture having a width varying in proportion to the errors in intensity of illumination tending to be produced by vignetting in said apparatus.

2. A projection printer including means for moving a film having an image thereon past an operational point, an optical system for producing an image of said film in an image plane, and means for moving sensitized film stock past the image in said image plane, a light source for illuminating the film, an illuminating aperture defining a beam of light from said source, and lens means for directing light from said aperture to the film and imaging said aperture on said film, the said aperture having a width varying in proportion to the errors in intensity of illumination tending to be produced by vignetting in said apparatus, and the edges of said aperture being defined by arcs of circles.

3. A projection printer including means for moving a film having an image thereon past an operational point, an optical system for producing an image of said film in an image plane, and means for moving sensitized film stock past the image in said image plane, a light source for illuminating the film, an illuminating aperture defining a beam of light from said source, and lens means for directing light from said aperture to the film and imaging said aperture on said film, the said aperture having a width varying in proportion to the errors in intensity of illumination tending to be produced by vignetting in said apparatus, and the edges of said aperture being defined by arcs of circles, and the said light source having a plurality of coil filaments with their plane along the optical axis of the apparatus.

LAWRENCE T. SACHTLEBEN.